United States Patent
Tian et al.

(10) Patent No.: US 7,009,761 B2
(45) Date of Patent: Mar. 7, 2006

(54) POWER TILT COMPENSATION USING AUTOMATIC POWER BALANCE CONTROL

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 10/448,634

(22) Filed: May 29, 2003

(65) Prior Publication Data

US 2004/0240041 A1    Dec. 2, 2004

(51) Int. Cl.
*H01S 3/00* (2006.01)
(52) U.S. Cl. .............................. 359/337.11; 359/337.12
(58) Field of Classification Search ........... 359/337.11, 359/337.12
See application file for complete search history.

(56) References Cited

U.S. PATENT DOCUMENTS

| | | | |
|---|---|---|---|
| 4,692,607 A | 9/1987 | LaBelle et al. | 250/205 |
| 5,463,487 A | 10/1995 | Epworth | 359/124 |
| 5,646,399 A | 7/1997 | Fukushima et al. | 250/226 |
| 5,818,629 A * | 10/1998 | Kinoshita | 359/337.11 |
| 5,907,429 A | 5/1999 | Sugata | 359/341 |
| 6,038,061 A * | 3/2000 | Sugaya | 359/337 |
| 6,120,190 A | 9/2000 | Leard et al. | 385/88 |
| 6,215,584 B1 | 4/2001 | Yang et al. | 359/341 |
| 6,219,176 B1 | 4/2001 | Terahara | 359/341 |
| 6,275,330 B1 | 8/2001 | Izumi | 359/341.42 |
| 6,323,994 B1 | 11/2001 | Li et al. | 359/341.1 |
| 6,373,574 B1 | 4/2002 | Gu et al. | 356/419 |
| 6,377,592 B1 | 4/2002 | Auracher et al. | 372/9 |
| 6,411,407 B1 | 6/2002 | Maxham | 359/110 |
| 6,417,962 B1 | 7/2002 | Amin et al. | 359/341.1 |
| 6,423,963 B1 | 7/2002 | Wu | 250/227.14 |
| 6,480,329 B1 | 11/2002 | Sugaya et al. | 359/341.42 |
| 6,486,950 B1 | 11/2002 | Munks et al. | 356/326 |
| 6,560,008 B1 * | 5/2003 | Wada | 359/337 |

FOREIGN PATENT DOCUMENTS

| | | |
|---|---|---|
| EP | 0 762 569 A2 | 3/1997 |
| EP | 1 137 129 A2 | 9/2001 |
| JP | 11-145910 | 5/1999 |
| WO | WO 02/29942 A2 | 4/2002 |

OTHER PUBLICATIONS

Notification of Transmittal of the International Search Report or the Declaration (PCT Rule 44.1) mailed Oct. 28, 2004 (12 pages) re International Application No. PCT/US 2004/016341.
Suzuki et al., "Dynamic Gain Control by Maximum Signal Power Channel in Optical Linear Repeaters for WDM Photonic Transport Networks," IEEE Photonics Technology Letters, vol. 10, No. 5, May 1, 1998, pp. 734-736.

* cited by examiner

Primary Examiner—Mark Hellner
(74) Attorney, Agent, or Firm—Baker Botts L.L.P.

(57) ABSTRACT

A method for correcting power tilt in an optical signal includes tapping off a representative portion of an optical signal and separating the representative portion into a first signal and a second signal. The first signal includes a first wavelength band and the second signal includes a second wavelength band different from the first wavelength band, wherein each wavelength band includes more than one channel. The method also includes detecting a power level of the first signal, detecting a power level of the second signal, and comparing the power levels of the first and second signals. The method further includes determining a power tilt for the optical signal based on the comparison and adjusting an amplifier gain based on the power tilt.

20 Claims, 2 Drawing Sheets

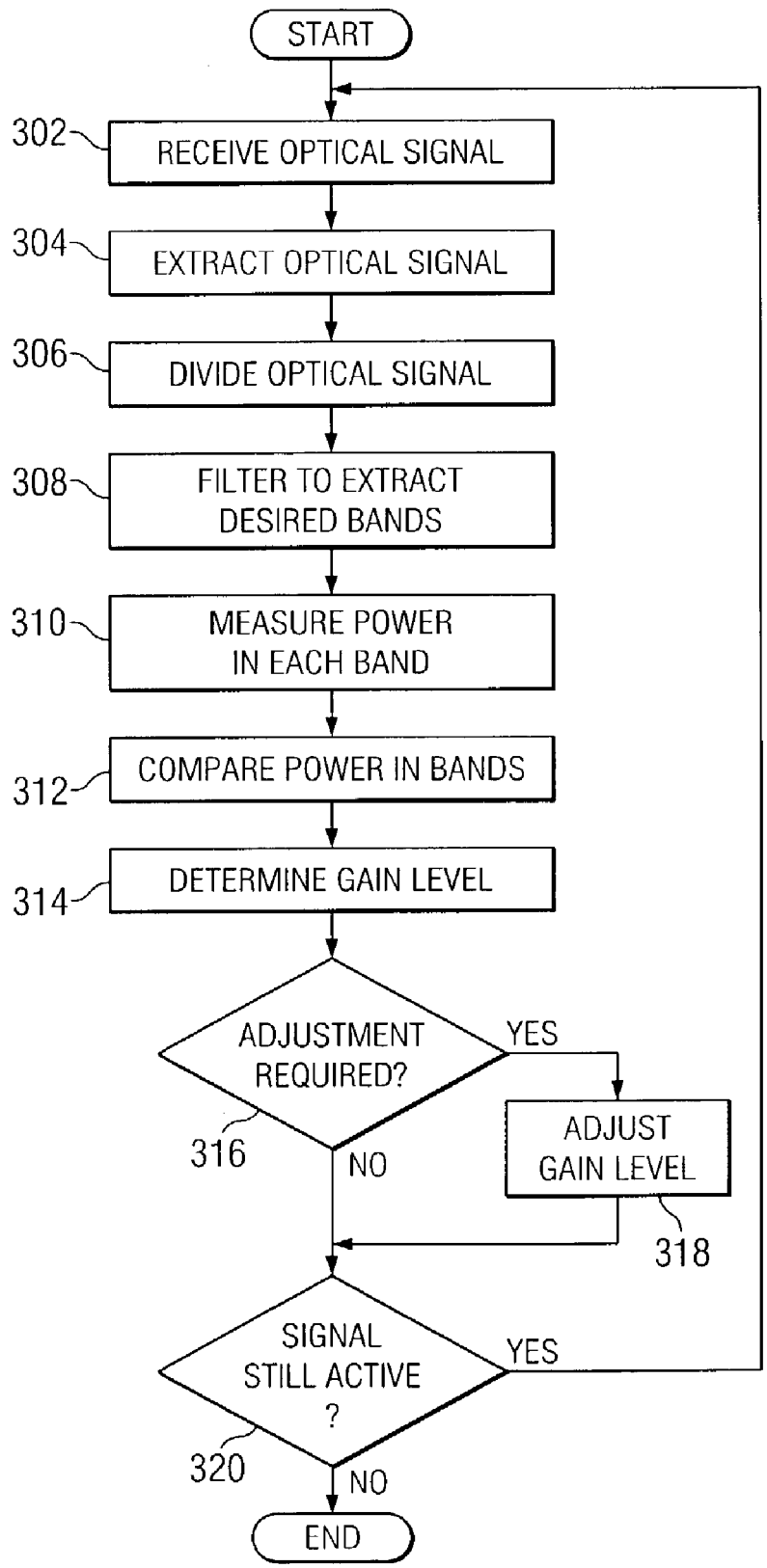

POWER TILT COMPENSATION USING AUTOMATIC POWER BALANCE CONTROL

TECHNICAL FIELD OF THE INVENTION

This invention relates in general to optical networks, and more particularly to techniques for compensating for power tilt using automatic power balance control.

BACKGROUND OF THE INVENTION

In optical networks, optical fibers, dispersion compensation fibers, and other optical devices over which the optical signals are transmitted may attenuate different wavelengths of the optical signals to different degrees, resulting in an imbalance in the power levels of each wavelength channel. This phenomenon is known as "power tilt." Optical networks use power balancing techniques in conjunction with amplifiers in the network, such as erbium-doped fiber amplifiers (EDFA), to compensate for tilt and to maintain a consistent level of optical signal in a wide range of wavelength channels. Power balancing improves transmission accuracy, network capacity, and other functions of optical networks. Devices that improve the ability of nodes in an optical network to perform power balancing, therefore, are valuable.

SUMMARY OF THE INVENTION

In accordance with the present invention, certain disadvantages associated with balancing power levels among different wavelengths have been substantially reduced or eliminated. In particular, certain embodiments of the present invention provide techniques for compensating for wavelength-dependent attenuation using automatic power balance control. Such techniques provide increased ability for optical networks to efficiently perform power balancing.

According to a first embodiment of the invention, a method for correcting power tilt in an optical signal includes tapping off a representative portion of an optical signal and separating the representative portion into a first signal and a second signal. The first signal includes a first wavelength band and the second signal includes a second wavelength band different from the first wavelength band, wherein each wavelength band includes more than one channel. The method also includes detecting a power level of the first signal, detecting a power level of the second signal, and comparing the power levels of the first and second signals. The method further includes determining a power tilt for the optical signal based on the comparison and adjusting an amplifier gain based on the power tilt.

According to a second embodiment of the invention, an optical node includes an optical tap, a splitter, a first photodetector, a second photodetector, and a processor. The optical tap extracts a representative portion of an optical signal. The splitter separates the representative portion of the optical signal into a first signal and a second signal, such that the first signal includes a first wavelength band and the second signal includes a second wavelength band different from the first wavelength band, wherein each wavelength band comprises more than one channel. The first photodetector detects a power level for the first signal, and the second photodetector detects a power level for the second signal. The processor compares the power levels for the first and second signals, determines a power tilt for the optical signal based on the comparison, and adjusts an amplifier gain for the signal based on the power tilt.

Technical advantages of certain embodiments of the present invention include accurate and efficient power balancing. Certain embodiments of the present invention select particular bands of an optical signal to determine appropriate power balancing levels for the optical signal. Selecting particular wavelength bands for comparison provides comparable accuracy to spectral analysis using less complicated components. Consequently, nodes according to embodiments of the present invention may be less prone to failure, and particular components may be replaced more easily when they do fail.

Other technical advantages of particular embodiments of the present invention include cost savings. Existing technologies that balance power among wavelengths often rely on expensive equipment such as spectrum analyzers. Alternatively, if such equipment is not used, the compensation for imbalances in power among wavelengths is incomplete or inflexible. Certain embodiments of the present invention use inexpensive components such as beam splitters and filters in conjunction with photodetectors to provide this cost savings. Furthermore, such components provide advantages over methods that provide less dynamic response to power tilt.

Other technical advantages of the present invention will be readily apparent to one skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a flowchart showing one example of a method of operation for automatic gain control according to a particular embodiment of the present invention.

DETAILED DESCRIPTION OF THE INVENTION

Figure 1:
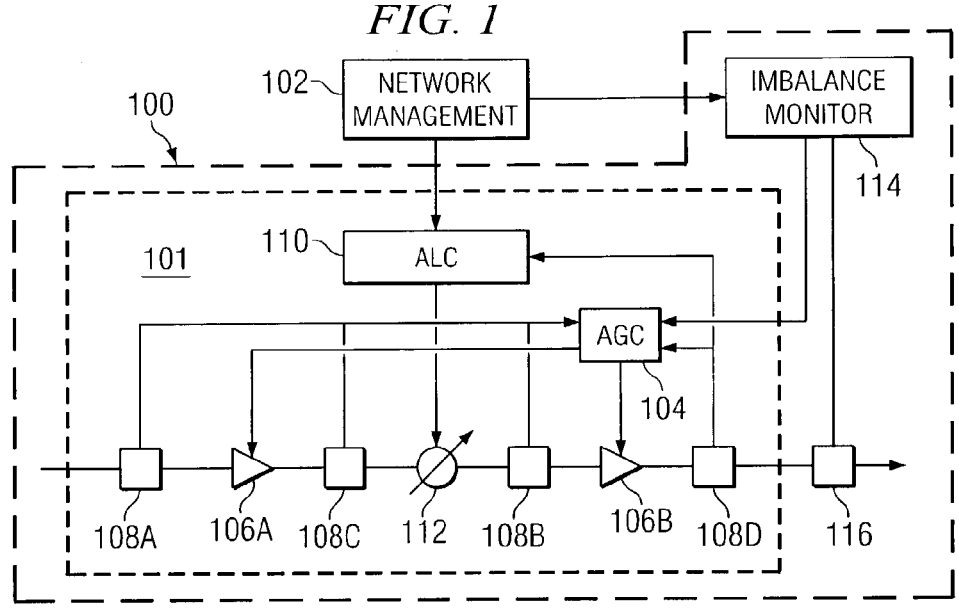
FIG. 1 shows an optical node according to a particular embodiment of the present invention.

FIG. 1 illustrates at least a portion of an example of an optical node 100 that receives, amplifies and outputs optical signals in an optical network. The optical network may include any suitable configuration of components that communicate information in the form of optical signals, including ring networks, star networks, linear networks, or any other suitable configuration. The optical network may use any suitable communication protocol including synchronous optical network (SONET), frame relay, asynchronous transfer mode (ATM), or other suitable communication protocol. The optical network communicates information as a multiplexed optical signal, in which information is encoded in multiple wavelengths, or "channels," in the optical signal. Consequently, information may be extracted using a dense wavelength division multiplexer (DWDM) or other suitable technique for extracting wavelengths within signals and adding information to, or dropping information from, those signals. The channels in the signal are provisioned by a network manager 102. Network manager 102 represents any hardware and/or software for provisioning channels in an optical network.

The communication of optical signals in optical media, such as optical fibers, causes attenuation in those optical signals. Because different wavelengths may have different transmission properties in the optical media, certain channels may be attenuated to a greater degree than others. This phenomenon contributes to "power tilt," a wavelength-dependent power imbalance. As power tilt becomes more severe, it can impair the functioning of the optical network in various ways such as, for example, by diminishing the power level of particular channels below a detectable level. To some extent, power tilt can be corrected by signal amplification, but if too much signal amplification is used, it can result in certain channels being overamplified. Consequently, it is desirable to have a method of determining power tilt that is sufficiently accurate to correct power tilt without resulting in excessive amplification. This allows the power per channel to be maintained at a substantially equal level for all channels, thus helping to maintain a consistent level of performance for all of the channels communicated in the optical network.

Node 100 is an example of a device that determines an appropriate amplification level to compensate for power tilt using techniques for detecting the power level of wavelength bands within an optical signal. In the depicted embodiment, node 100 includes an optical amplifier 101, a variable attenuator 112, an optical tap 116, and an imbalance monitor 114. Overall, node 100 determines a power tilt for an optical signal using imbalance monitor 114 and compensates for the power tilt using a two-stage amplification process described below.

Amplifier 101 represents any suitable form of optical amplification technology. In the depicted embodiment, amplifier 101 is a two-stage amplifier that includes amplifier gain media 106A and 106B (collectively referred to as "amplifier gain media 106"), power monitors 108 (referring generally to monitors 108A, 108B, 108C, and 108D), variable attenuator 112, automatic gain control module 104, and automatic level control module 110. Amplifier gain media 106 are erbium-doped optical fibers that are driven by a pumping laser controlled by automatic gain control module 104, known as erbium-doped fiber amplification (EDFA). Because the gain differs as a function of wavelength, EDFA amplifies certain channels more than others, and as a result, EDFA can provide some compensation for power tilt. This difference in gain can be adjusted by adjusting the levels of the pump laser. As EDFA gain increases, amplifier gain media 106 provide not only a greater increase in the overall power but also a different degree of gain tilt. These effects are related to one another, so that a different level of gain tilt also produces a different overall gain and vice versa.

Because the degree of gain tilt and overall gain are related, compensating for power tilt using amplifier gain media 106 may result in an average power level for the optical signal that is higher than the desired power level. In that case, a variable attenuator 112 may be used to adjust the overall gain of amplifier 101. Variable attenuator 112 is an optical component that imparts an almost-uniform power loss to all channels in the optical signal. Thus, if the power per channel is essentially equal across all channels but the average power is too high, variable attenuator 112 can reduce the average power to the desired level without producing power tilt.

The amplification process is controlled by an automatic gain control module 104 and an automatic level control module 110. Automatic gain control module 104 determines a gain for amplifier gain media 106 and manipulates the respective pumping lasers of amplifier gain media 106 to produce the desired gain. Automatic gain control module 104 may include any suitable hardware and/or software useful for determining and setting the gain of amplifiers 106, including processors, memory, and communication interfaces for exchanging information with other components of node 100. Automatic level control module 110 controls the operation of variable attenuator 112 to maintain the average channel power of the optical signal at a desired level, and may include any suitable hardware and/or software for determining and setting the level of attenuation imparted by variable attenuator 112, including processors, memory, and communication interfaces for exchanging information with other components of node 100. In particular embodiments, automatic gain control module 104 and automatic level control module 110 may share one or more hardware and/or software components, so that their respective functions are effectively performed by the same component or set of components.

Power monitors 108A, 108B, 108C, and 108D (collectively referred to as "power monitors 108") provide information about the power level of optical signals to automatic gain control module 104 and automatic level control module 110. Power monitors 108 represent any suitable component for detecting the total power communicated in an optical signal. Power monitors 108 may range in complexity from simple photodiode detectors to complex spectral analyzers.

Node 100 determines the level of power tilt using an imbalance monitor 114. Imbalance monitor 114 represents one or more components that make determinations about the relative power of wavelengths in a received optical signal and reactively control automatic gain control module 104 to produce desired levels of gain to compensate for power tilt in the optical signal. Imbalance monitor 114 determines relative power levels in different wavelength ranges of the optical signal by extracting a portion of the optical signal using optical tap 116, separating the optical signal into multiple components such that each separated component has a particular wavelength range, measuring the power level of each such component, and comparing the power levels of the components. This allows imbalance monitor 114 to determine a gain setting for amplifiers 106 that corrects for the power tilt in the optical signal without requiring a measurement of the power of each individual channel in the optical signal. In particular embodiments, imbalance monitor 114 may be integrated partially or completely with automatic gain control module 104 and/or automatic level control module 110.

In operation, automatic gain control module 104, automatic level control module 110, and imbalance monitor 114 cooperatively control the amplification of an incoming optical signal to produce a balanced output signal with proper power levels. Node 100 receives an optical signal, and power detector 108A communicates power level of the signal to automatic gain control module 104. Automatic gain control module 104 adjusts the pumping laser in the amplifier 106A to produce a desired gain. The optical signal passes through variable attenuator 112, which attenuates the signal, and the power level of the signal is then remeasured by power detector 108B to verify that a sufficient amount of gain is being provided by amplifier 106A. Automatic gain control module 104 again responds to the signal from power detector 108B to produce desired gain levels at amplifier 106B.

After the signal is amplified a second time, the power level is detected by power monitor 108D and communicated to automatic level control module 110 and automatic gain control module 104. Automatic level control module 110 accordingly adjusts the variable attenuator 112 to attain the desired power level after amplifier 106B. Imbalance monitor 114 extracts a portion of the signal using tap 116 in order to determine power tilt. To determine the power tilt, imbalance monitor 114 separates bands within the optical signal and compares the relative power within those bands.

Imbalance monitor 114 uses the power level information it identifies from the bands and information about channels received from network manager 102, such as the total number of channels, channel allocation, or other suitable information, to calculate a gain level for amplifiers 106A and 106B, as described in further detail below. The information is communicated to automatic gain control module 104, which makes suitable adjustments in amplifiers 106 to produce the desired gain compensation. Thus, imbalance monitor 114 provides an automatic feedback method to correct power tilt in the optical signal.

Figure 2:
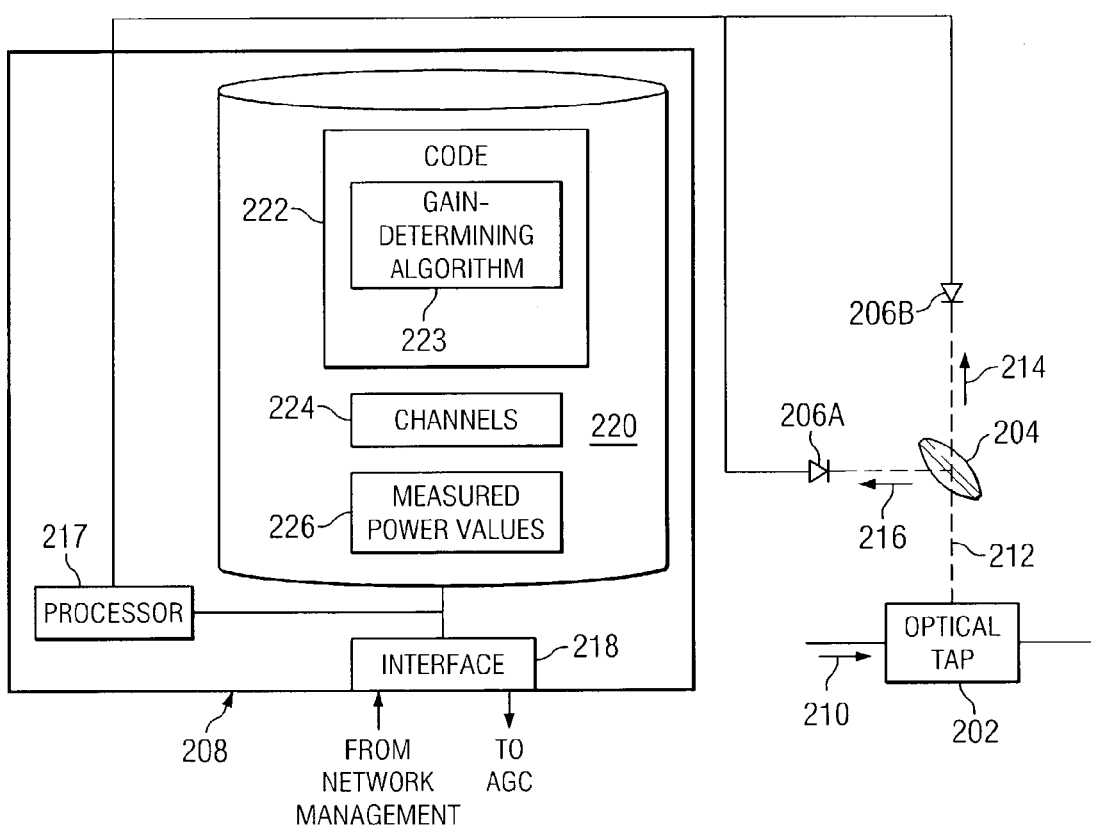
FIG. 2 shows a particular embodiment of an imbalance detector in the optical node of FIG. 1.

FIG. 2 shows a particular embodiment of imbalance monitor 114. Imbalance monitor 114 includes a splitter 204, photodetectors 206A and 206B, and an automatic balance control module 208. In general, imbalance monitor 114 detects power levels of wavelength bands within an optical signal 210 in order to perform power balancing between wavelengths. In the depicted embodiment, optical tap 116 taps out a representative portion 212 of optical signal 210 and communicates portion 212 of signal 210 to imbalance monitor 114.

Tap 116 represents any component for separating a representative portion 212 from optical signal 210. Tap 116 may include any suitable optical component including but not limited to a fused fiber coupler, a thin-film based coupler, or any other suitable component for optical splitting. In general, it is desirable for tap 116 to divide optical signal 110 without significantly reducing the power and wavelength dependence of optical signal 210 or otherwise interfering with the communication of optical signal 210 to subsequent nodes in the optical network.

Splitter 204 separates portion 212 into two optical signals 214 and 216, each having a characteristic wavelength band. Splitter 204 passes a first wavelength band 214 from portion 212 of optical signal 210 to photodetector 206B. Splitter redirects a second wavelength band 216 to photodetector 206A. Splitter 204 is not limited to an optical splitter 204; it may include splitters, filters, diffraction gratings, prisms, lenses, mirrors or any other suitable optical component for separating portion 212 into signals 214 and 216 with characteristic wavelength ranges and/or removing any undesired components. Furthermore, splitter 204 need not be limited to producing two output signals, but instead may produce any desired number of signals, and the range of the output signals need not span the entire range of wavelengths in optical signal 210.

Photodetectors 206A and 206B (collectively referred to as photodetectors 206) represent any suitable device for detecting the total power level of the signals 214 and 216. Photodetectors 206 may include any suitable optical measurement component, including photodiodes, special analyzers, CCDs, or any other suitable device for ascertaining power level of an optical signal. In particular embodiments, photodetectors 206 may be suitably selected to be most responsive in the wavelength band of signals 214 and 216 in order to increase the efficiency and accuracy of detection.

Automatic balance control module 208 represents any collection of components, including hardware and/or software, for comparing the power levels of separated wavelength bands 214 and 216, for determining the power tilt of the optical signal based on the comparison, and for communicating a control signal to automatic gain control module 104 to set a gain that compensates for the power tilt. In particular embodiments, components of automatic balance control module 208 may be shared by other components of node 100, such as automatic gain control module 104 and automatic level control module 110. In the depicted embodiment, automatic balance control module 208 includes a processor 217, an interface 218, and a memory 220. Processor 217 represents any hardware and/or software for processing information and performing any suitable tasks for automatic balance control module 208. Processor 217 may include microprocessors, microcontrollers, digital signal processors, or any other suitable component. Interface 218 represents any port or connection, whether real or virtual, that allows automatic balance control module 208 to exchange information with other components of optical node 100 and/or network manager 102. In particular, interface 218 allows automatic balance control module 208 to receive channel information from network manager 102, such as total number of channels, channel allocation, or other suitable information, and to communicate desired amplification levels to automatic gain control module 104.

Memory 220 includes any form of information storage, whether volatile or non-volatile, and may include optical media, magnetic media, removal media, local components, remote components, or any other suitable form of information storage. In the particular embodiment depicted, memory 220 stores code 222, channel information 224, and measured power levels 226. Code 222 represents any instructions executed by processor 217 to perform tasks of automatic balance control module 208. Code 222 includes a gain-determination algorithm 223 that determines gain for amplifiers 106 based on measured power levels 226. Channel information 224 represents information about provisioned channels received from network manager 102. Measured power levels 226 represent stored values measured by photodetectors 206.

In operation, imbalance monitor 114 detects power levels of wavelength bands 214 and 216, determines power tilt based on a comparison of the power levels and channel information, and communicates instructions to automatic gain control module 104 to produce a suitable gain to compensate for the power tilt. Tap 116 receives an optical signal 210 and taps off a portion 212 of the signal. Splitter 204 separates signal 210 into signals 214 and 216 comprising different wavelength bands. The particular bands may also be selected to provide a representative sample of power levels from the wavelength spectrum of signal 210. For example, in a particular embodiment, signal 214 represents a portion of optical signal 210 in the red wavelength range, while signal 216 represents wavelengths in the blue wavelength range. Photodetectors 206A and 206B detect the respective power levels of the signal and communicate this information to processor 217. In different embodiments, portion 212 may be divided into more than two signals with a correspondingly increased number of photodetectors 206.

Processor 217 compares the power levels of the signals 214 and 216 to determine an effective level of imbalance between wavelengths in optical signal 210. In one example of such a determination, processor 217 uses channel information 224 to determine the number of channels in signals 214 and 216. Processor 217 divides measured power value 226 for each signal 214 or 216 by the number of channels in signal 214 or 216 to determine an average power per channel for signals 214 and 216. The relative power-per-channel values provide an indication of the power tilt in signal 210. Processor 217 then inputs the average power-per-channel values for signals 214 to 216 into gain-determining algorithm 223 to calculate the gain for each amplifier 106, which processor 217 then communicates the result to automatic gain control 104 using interface 218. This method of determining gain is only one of numerous possible alternative methods. For example, processor 217 may communicate the measured values directly to automatic gain control module 104, take a ratio of total power levels for signals 214 and 216, compare power levels to previous measured power levels 226, or perform any other suitable calculation or exchange of information.

Notable features of the depicted embodiment of imbalance monitor 114 include the use of relatively simple components for tap 116, splitter 204, and photodetectors 206. Such components may be relatively inexpensive compared to alternatives such as spectrum analyzers. In addition, imbalance monitor 114 is adaptable to any number of suitable wavelength divisions and is relatively compatible with existing equipment standards. Overall, imbalance monitor 114 provides a relatively inexpensive and adaptable solution to controlling the problem of power tilt in optical signal 210.

FIG. 3 shows one example of a method of operation for imbalance monitor 114. Tap 116 receives optical signal 210 at step 302 and extracts portion 212 of signal 210 at step 304. Splitter 204 divides portion 212 into two signals at step 306 and filters the signals to produce signals 214 and 216 with selected wavelength bands at step 308. Photodetectors 206 then measure the power in each of signals 214 and 216 at step 310.

Processor 217 receives the power readings from photodetectors 206 and compares the power levels at step 312. As part of this comparison, processor 217 may calculate average power-per-channel values for each signal 214 and 216 as described above. Based on the comparison, processor 217 determines a gain level for amplifiers 106. At decision step 316, processor 217 determines whether an adjustment in the amplification level of amplifiers 106 is required. If an adjustment is required, processor 217 adjusts the gain level by communicating with automatic gain control module 104 at step 318. Otherwise, processor 217 leaves the gain at the same level. If monitor 114 is still receiving optical signal 210 at decision step 320, then the method repeats from step 302. Otherwise, the method is complete.

The described method of operation is only one of numerous possible methods for correcting power tilt based on measuring the power of selected wavelength bands from an optical signal, and various possible modifications will be apparent to one skilled in the art. Different components or additional components may be used to perform the various steps, and the functions of various components may be distributed among multiple components or consolidated within one or more existing components as well. For example, the functions of the automatic balance control module 208 and automatic gain control module 104 may be performed by a single component or an integrated collection of components. Particular steps may be omitted or added, and the described steps may be performed in a different order to achieve desired results. In particular, the described method may be modified in any way consistent with the various methods of operation described above in conjunction with FIGS. 1 and 2.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for correcting power tilt in an optical signal, comprising:
   tapping off a representative portion of an optical signal;
   separating the representative portion into a first signal and a second signal, the first signal comprising a first wavelength band and the second signal comprising a second wavelength band different from the first wavelength band, wherein each wavelength band comprises more than one channel;
   detecting a power level of the first signal;
   detecting a power level of the second signal;
   comparing the power levels of the first and second signals;
   determining a power tilt for the optical signal based on the comparison; and
   adjusting an amplifier gain based on the power tilt.

2. The method of claim 1, wherein:
   the method further comprises receiving the number of channels in the first and second wavelength bands; and
   the step of determining the power tilt comprises determining the power tilt based at least in part on the number of channels in the first and second wavelength bands.

3. The method of claim 2, wherein the step of determining the power tilt based at least in part on the number of channels comprises:
   dividing the power level of the first signal by the number of channels in the first signal to determine an average power per channel of the first signal;
   dividing the power level of the second signal by the number of channels in the second signal to determine an average power per channel of the second signal; and
   comparing the average power per channel of the first and second signals to determine the power tilt.

4. The method of claim 1, wherein the step of adjusting comprises communicating power tilt information to an automatic gain control module.

5. The method of claim 4, wherein the step of adjusting further comprising:
   receiving the power tilt information; and
   in response to receiving the power tilt information, controlling the gain of at least one amplifier to compensate for the power tilt.

6. The method of claim 5, wherein the step of adjusting further comprises:
   receiving a signal power level measured after each of the amplifiers; and
   determining the gain based on the power tilt information and the signal power level after each of the amplifiers.

7. The method of claim 1, wherein:
   the step of tapping comprises optically splitting the representative portion from the optical signal; and
   the step of separating comprises:
      splitting the signal into two signals; and filtering the first signal and the second signal to produce the desired wavelength bands.

8. A device, comprising:
   an optical tap operable to extract a representative portion of an optical signal;
   a splitter operable separate the representative portion of the optical signal into a first signal and a second signal, the first signal comprising a first wavelength band and the second signal comprising a second wavelength band different from the first wavelength band, wherein each wavelength band comprises more than one channel;

a first photodetector operable to detect a power level for the first signal;

a second photodetector operable to detect a power level for the second signal; and a processor operable to:
compare the power levels for the first and second signals;
determine a power tilt for the optical signal based on the comparison; and
adjust an amplifier gain for the signal based on the power tilt.

9. The device of claim 8, wherein:
the device further comprises an interface operable to receive the number of channels in the first and second wavelength bands from a network manager; and
the processor determines the power tilt based at least in part on the number of channels in the first and second wavelength bands.

10. The device of claim 9, wherein the processor is further operable to:
divide the power level of the first signal by the number of channels in the first signal to determine an average power per channel of the first signal; and
divide the power level of the second signal by the number of channels in the second signal to determine an average power per channel of the second signal; and
compare the average power per channel of the first and second signals to determine the power tilt.

11. The device of claim 8, further comprising an automatic gain control module operable to control at least one amplifier gain medium to compensate for the power tilt.

12. The device of claim 11, wherein the automatic gain control module is further operable to:
receive a signal power level measured after each of the amplifier gain media; and
determine the amplifier gain based on the power tilt information and the signal power level after each of the amplifier gain media.

13. The device of claim 12, further comprising the amplifier gain media.

14. The device of claim 13, wherein the amplifier gain media comprise erbium-doped fibers.

15. The device of claim 8, wherein:
the splitter optically splits the optical signal into the first signal and the second signal; and
the monitor further comprises a first filter operable to filter the first signal to isolate the first wavelength band and a second filter operable to filter the second signal to isolate the second wavelength band.

16. A system, comprising:
means for tapping off a representative portion of an optical signal;
means for separating the representative portion into a first signal and a second signal, the first signal comprising a first wavelength band and a second signal comprising a second wavelength band different from the first wavelength band, wherein each wavelength band comprises more than one channel;
means for detecting a power level of the first signal;
means for detecting a power level of the second signal;
means for comparing the power levels of the first and second signals;
means for determining a power tilt for the optical signal based on the comparison; and
adjusting an amplifier gain based on the power tilt.

17. The system of claims 16, further comprising:
means for dividing the power level of the first signal by the number of channels in the first signal to determine an average power per channel of the first signal;
means for dividing the power level of the second signal by the number of channels in the second signal to determine an average power per channel of the second signal; and
means for comparing the average power per channel of the first and second signals to determine the power tilt.

18. The system of claim 16, further comprising means for communicating power tilt information to an automatic gain control module of an optical node.

19. The system of claim 18, further comprising:
means for receiving the power tilt information; and
means for controlling the gain of at least one amplifier to compensate for the power tilt in response to receiving the power tilt information.

20. The system of claim 16, further comprising:
means for receiving a signal power level measured after each of the amplifiers; and
means for determining the gain based on the power tilt information and the signal power level after each of the amplifiers.

* * * * *